(12) United States Patent
Kendig

(10) Patent No.: US 7,691,498 B2
(45) Date of Patent: Apr. 6, 2010

(54) CHROMATE-GENERATING CORROSION INHIBITOR

(76) Inventor: Martin William Kendig, 496 Hillsborough St., Thousand Oaks, CA (US) 91361

( * ) Notice: Subject to any disclaimer, the term of this patent is extended or adjusted under 35 U.S.C. 154(b) by 0 days.

(21) Appl. No.: 12/108,597

(22) Filed: Apr. 24, 2008

(65) Prior Publication Data

US 2009/0269616 A1    Oct. 29, 2009

(51) Int. Cl.
  B32B 19/00    (2006.01)
  C23F 11/00    (2006.01)
(52) U.S. Cl. .................... 428/702; 428/469; 106/14.44; 106/14.45; 423/269; 252/68; 252/388; 252/387; 252/389.1; 252/389.5
(58) Field of Classification Search ................. None
  See application file for complete search history.

(56) References Cited

U.S. PATENT DOCUMENTS

| | | | | |
|---|---|---|---|---|
| 3,240,662 A * | 3/1966 | Clark et al. | ................. | 428/426 |
| 4,171,231 A * | 10/1979 | Bishop et al. | ................. | 148/258 |
| 4,263,059 A * | 4/1981 | Guhde et al. | ............. | 428/472.1 |
| 4,359,346 A * | 11/1982 | Da Fonte, Jr. | ................. | 148/266 |
| 4,359,348 A * | 11/1982 | Crotty | ......................... | 148/250 |
| 4,367,099 A * | 1/1983 | Lash et al. | .................. | 148/265 |
| 5,304,257 A * | 4/1994 | Pearlstein et al. | ........... | 148/265 |
| 5,374,347 A * | 12/1994 | Pearlstein et al. | ........... | 205/203 |
| 5,415,702 A * | 5/1995 | Bishop et al. | ................ | 148/258 |
| 6,096,140 A * | 8/2000 | Susa et al. | ................... | 148/253 |
| 6,224,657 B1 * | 5/2001 | Myers et al. | .............. | 106/14.12 |
| RE38,285 E * | 10/2003 | Susa et al. | ................... | 148/253 |
| 6,648,986 B1 * | 11/2003 | Tang et al. | ................... | 148/267 |
| 6,887,321 B2 * | 5/2005 | Parkos et al. | ................. | 148/264 |
| 6,946,201 B2 * | 9/2005 | Preikschat et al. | ....... | 428/472.1 |
| 7,018,486 B2 * | 3/2006 | Bhatia | ......................... | 148/267 |
| 7,029,541 B2 * | 4/2006 | Diaddario et al. | ........... | 148/265 |
| 7,314,671 B1 * | 1/2008 | Preikschat et al. | .......... | 428/658 |

OTHER PUBLICATIONS

Lin Xia, et al. Journal of The Electrochemical Society, 2000, The Electrochemical Society, Inc., 147 (7), 2556-2562.*
E. Akiyama et al. Journal of The Electrochemical Society, 2003, The Electrochemical Society, Inc., 150 (2), B83-B91.*
M. Kendig et al. Journal of The Electrochemical Society, 2002, The Electrochemical Society, Inc., 149 (2), B47-B51.*

* cited by examiner

*Primary Examiner*—Jennifer McNeil
*Assistant Examiner*—Vera Katz
(74) *Attorney, Agent, or Firm*—McNees Wallace & Nurick, LLC

(57) ABSTRACT

A coating composition is disclosed that includes a binder, a tri-valent chromium solid, and a stabilized oxidizing agent. The coating composition is used in a method to protect a surface of a metallic article, such as an aluminum article. The tri-valent chromium solid forms a soluble hexavalent chromium compound as a result of reaction with the oxidizing agent when activated in the presence of a corrosive environment. The released water soluble hexavalent chromium migrates to coating defects to protect the metallic article.

24 Claims, 4 Drawing Sheets

CHROMATE-GENERATING CORROSION INHIBITOR

FIELD OF THE INVENTION

This invention relates generally to the protection of an article against corrosion, and more particularly, to such protection achieved with a hexavalent-chromium free, corrosion-inhibiting coating applied to the surface of the article.

BACKGROUND OF THE INVENTION

Metals may be attacked by corrodants that are present in the environments in which the metals operate. For example, aluminum articles contacted to a salt-containing environment may be attacked at their surfaces either generally over a large area or locally in limited areas, for example at weld joints, at bolt holes, or at small inclusions or pits in the surface. The corrosion damage increases over time and with continued exposure, eventually possibly leading to such severe corrosion that there is a premature initiation of failure of the article at an earlier time than would otherwise be the case in the absence of the corrosion damage. Large amounts of money are spent on the corrosion protection, yet corrosion damage and corrosion-induced premature failure are still widespread.

Coatings are widely employed to protect surfaces against corrosion damage. Some of the most effective coatings employ hexavalent chromium having chromium atoms in the +6 oxidation state ($Cr^{+6}$), usually in the form of chromate ions $CrO_4^{-2}$ or dichromate ions $Cr_2O_7^{=}$, as part of the coatings to impact corrosion resistance to the surfaces. Chromate conversion coatings chemically bond strongly to the surfaces of the articles when exposed at room temperature, and thereafter inhibit corrosion at the surfaces. Surfaces passivated by reaction with chromate tend to slow the rate of oxygen reduction, which drives the corrosion reaction. By being effective at very low concentrations, chromate is one of the most effective universal corrosion inhibitors.

There is a desire to reduce the amount of chromate used in coatings and other applications, largely because hexavalent chromium ions can have adverse environmental effects and adverse health effects. Future regulations are expected to impose large reductions in the amount of hexavalent chromate that may be used in most applications, including coatings for reducing the corrosion of articles.

At the present time, there are no effective substitutes for the chromate-containing coatings. Some non-chromate coatings are available to improve the adhesion of paint primers and paints to surfaces, but the non-chromate coatings themselves have less corrosion-resistance than those containing chromate. Other non-chromate coatings serve only as barriers between a corrosive medium and the surface of the underlying metal, without serving as active corrosion inhibitors. If the barrier of these coatings is breached, as for example by a hole or scratch extending through the barrier coating, there is no chemical inhibition of the resulting potential corrosion.

There is a need for an improved coating approach to protecting articles against corrosive attack, while using little or no hexavalent chromium. The present invention fulfills this need, and further provides related advantages by retaining the same efficacy as chromate.

The foregoing examples and limitations associated therewith are intended to be illustrative and not exclusive. Other limitations of the related art will become apparent to those of skill in the art upon reading of the specifications and study of the drawings.

SUMMARY OF THE INVENTION

The following embodiments and aspects thereof are described and illustrated in conjunction with systems and methods that are meant to be exemplary and illustrative, not limiting in scope. In various embodiments, one or more of the problems described above in the Background have been reduced or eliminated, while other embodiments are directed to other improvements.

The present approach provides a metal article protected by a coating that is free of hexavalent chromium and chromate ions, and a method for applying and protecting such an article using the hexavalent-chromium-free coating. This technique avoids the use of chromate ions in the coating, while achieving excellent protection of the article against corrosion.

A first embodiment of the invention includes a corrosion inhibiting composition including a binder, a tri-valent chromium solid, and an oxidizing agent. The oxidizing agent remains unreactive until the composition is exposed to a corrosive environment.

A second embodiment of the invention includes a method of protecting a surface of a metallic article, the method includes the steps of providing a metal article having a surface and coating the surface with a coating composition to form a coated surface. The coating composition includes a binder, a tri-valent chromium solid, and an oxidizing agent. The oxidizing agent remains unreactive until the composition is exposed to a corrosive environment.

A third embodiment of the invention includes a coated article including a surface, and a coating adhered to the surface. The coating comprises a binder, a tri-valent chromium solid, and an oxidizing agent. The oxidizing agent remains unreactive until the composition is exposed to a corrosive environment.

One advantage of the present invention includes providing a corrosion protective coating that does not contain hazardous hexavalent chromium (including chromate or dichromate) until the coating is exposed to a corrosive environment.

Another advantage of the present invention includes the idea of containing the oxidizing compound in a benign matrix such as ion exchange compounds enabling the inclusion of oxidizing compounds in the coating that otherwise could not be included.

Yet another advantage the coating is that it enables the use of a wide variety of inert Cr(III) compounds as non-hazardous precursors for hexavalent chromium inhibitors.

Yet another advantage of the coating is that it enables properties that are chemically identical to chromate containing coatings but without the presence of the hazardous material in the un-activated coating.

Yet another advantage of the coating is that it does not expose workers to hexavalent chromium during coating application.

Yet another advantage of the coating is that it does not expose workers to hexavalent chromium during coating stripping using dry methods such as $CO_2$ snow-blasting, wheat blasting, and polymer resin blasting.

Further aspects of the method and apparatus are disclosed herein. Other features and advantages of the present invention will be apparent from the following more detailed description of the preferred embodiment, taken in conjunction with the accompanying drawings that illustrate, by way of example, the principles of the invention. The features, functions, and advantages of the present invention can be achieved independently in various embodiments of the present inventions or may be combined in yet other embodiments.

DETAILED DESCRIPTION OF THE INVENTION

The present invention now will be described more fully hereinafter with reference to the accompanying drawing, in which a preferred embodiment of the invention is shown. This invention may, however, be embodied in many different forms and should not be construed as limited to the embodiments set forth herein; rather, these embodiments are provided so that this disclosure will be thorough and complete and will fully convey the scope of the invention to those skilled in the art. All composition percents are given as weight percents, unless otherwise specified.

Figure 1:
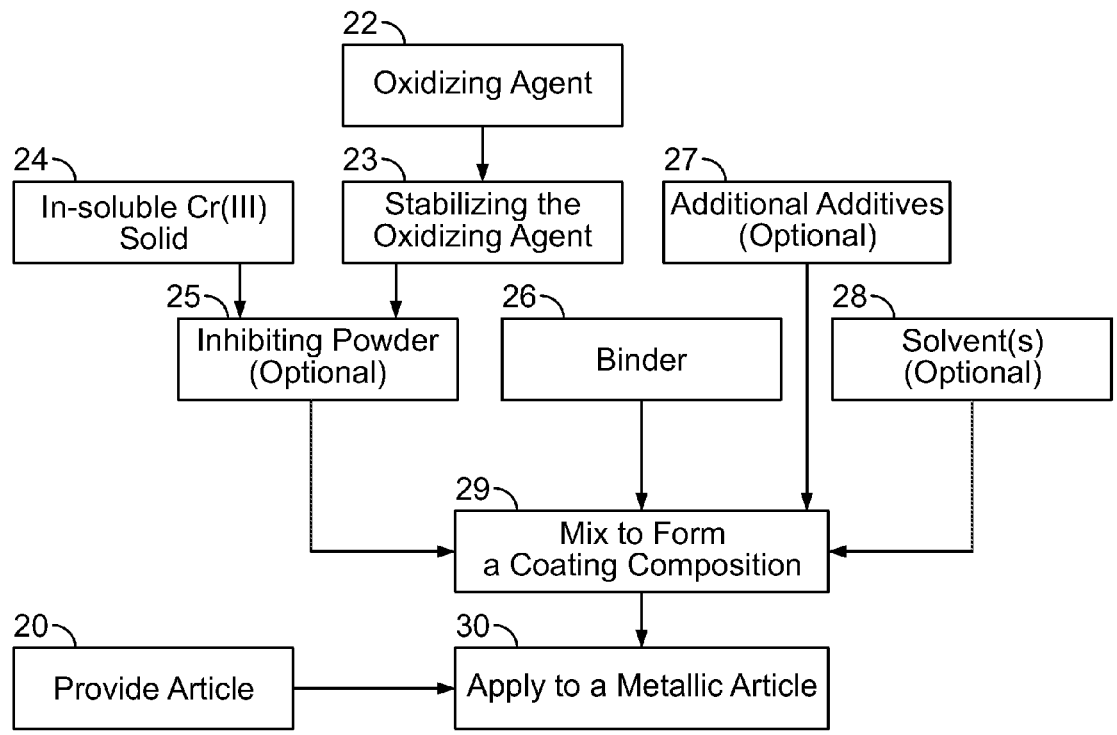
FIG. 1 is a block flow diagram of an exemplary process for applying and using the surface protection of the present disclosure.
Figure 2A:
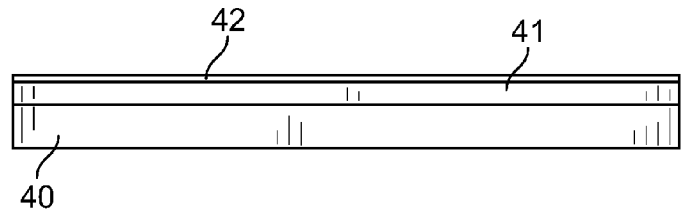
FIGS. 2A and 2B are a set of schematic drawings illustrating the structures during the surface protection processing steps of FIG. 1.
Figure 2B:
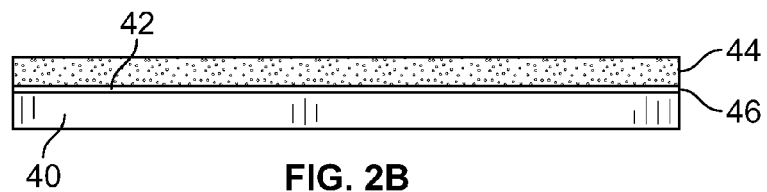

FIG. 1 depicts the steps in a process for protecting a surface of an article, and FIGS. 2A-2B show the structures and chemical states at various stages of the processing. The method includes a first step 20 of providing an article 40 having a surface 42. The article 40 may be of any material whose corrosion may be inhibited by chromate. For example, the material may be selected from the group including, but not limited to, aluminum, carbon steel, magnesium alloys, copper, brass, or bronze. A preferred material is an aluminum. As used herein, "aluminum" when used to describe the article 40 may refer to pure aluminum, aluminum containing alloys, and aluminum-base alloys. An aluminum-base alloy contains more aluminum than any other element.

The article may be of any physical form having a protective metal oxide layer 41 having a surface 42. The surface 42 may be flat, undulating, curved or any other physical form. The article 40 need not be specifically prepared prior to the processing described herein, other than ensuring that the surface 42 is not dirty or covered in whole or in part by a physical barrier of organic matter as oil or grease. The surface 42 may be part of a larger surface (not shown) which may or may not be provided for coating, and which may or may not be ensured to be free of any physical barrier. As for the surface 42, if there is dirt or a barrier, it is preferably removed by physical cleaning in first step 20.

Referring to FIG. 1, an exemplary method of applying a corrosion protective coating upon a metallic article will now be discussed. A corrosion protective coating composition is prepared during steps 22 through 29. The coating composition is prepared by first providing an oxidizing agent in step 22. The oxidizing agent is any compound having an oxidation potential greater than that of the following reaction:

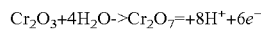
$Cr_2O_3 + 4H_2O \rightarrow Cr_2O_7^= + 8H^+ + 6e^-$ with $Eox = 1.242 + (RT/6F)\ln(Cr_2O_7^=) + (RT8/6F)\ln(H^+)$ where $(Cr_2O_7^=)$ is the critical concentration for $Cr_2O_7^=$ required to inhibit corrosion and $\ln(H+) = -pH/2.303$, R is the gas constant and T is the absolute temperature. Eo is the standard oxidation potential for the formation of $Cr_2O_7^=$ from $Cr_2O_3$.

Given that

$Mn^{2+} + 4H_2O \rightarrow MnO_4^- + 8H^+ + 5e^-$ with $Eox = 1.507 + (RT/5F)\ln\{(MnO_4^-)/(Mn^{2+})\} + (RT8/5)\ln(H^+)$, the oxidation potential for $MnO_4^-$ in an excess to $Mn^{2+}$ and at neutral pH exceeds the potential for dichromate formation from $Cr_2O_3$. Hence, $MnO_4^-$ is exemplary of an oxidizing agent, as it will convert the $Cr_2O_3$ to the dichromate.

In other embodiments, the oxidizing agent may be an oxidant selected from the group including $MnO_4^-$, $H_2O_2$, and peroxydisulfate. Other potential oxidizing species would be $Ce^{4+}$, $VO_3^-$, peroxy-disulfate, peroxide, peroxydiacetate, or other similar oxidizing species capable of oxidizing $Cr_2O_3$ to the hexavalent corrosion inhibiting compound.

In all cases these oxidizing agents or ionic species must be made stable in a solid form or must already exist in a stable solid form having the properties:

1) in the presence of a corrosive aqueous environment, they release a water soluble oxidant capable of oxidizing $Cr_2O_3$ or other solid compounds comprised of Cr in the benign +3 valence state to the corrosion-inhibiting Cr(VI) state. The water soluble Cr(VI) compound will travel to defects in the coating where it will form a passivating surface on the exposed metal.

2) as dry powders, they can be formulated with the environmentally benign trivalent chromium solid and the film forming binder without reacting.

The oxidizing agent is then stabilizing in step 23. Stabilized means that the solid, in the dry condition or during the process of forming the coating, reacts neither with the other coating components or with the solid containing the Cr(III) precursor. For example, the oxidizing agents may be stabilized in any of the following ways:

(1) Ion exchange into layered compounds such as hydrotalcite
(2) Ion exchange into zeolites
(3) Intercalation with any layered solid such as graphene
(4) Strongly adsorbed on nano-particles or nano-tubes
(5) In addition the oxidant may be naturally stabilized as an oxide solid such as $V_2O_5$.

An in-soluble Cr(III) solid is provided in step 24. The tri-valent chromium solid includes insoluble and sparingly water soluble tri-valent chromium (Cr(III)) solids. In one embodiment, the Cr(III) solid may be selected from a group of Cr(III) compounds including synthetic chromium carbonates and chromium phosopahte. In another embodiment, the Cr(III) solid may be selected from a group including Cr(III) oxides, chromites, silicates, carbonates and titanates. For example, the Cr(III) solid may be $Cr_2O_3$, $CrPO_4$, calcium chromium silicate, barbertonite, chromite, magnesiochromite, rare-earth chromites, zincochromites or other similar compound containing tri-valent chromium in a water insoluble or sparingly soluble form. Rare-earth chromites and zincochromites may be particularly attractive Cr(III) containing compounds since their reaction with released permanganate may produce $Zn^{2+}$ or rare earth cations as well as chromate, all of which will inhibit corrosion. In another exemplary embodiment, the Cr (III) solid contains little or no hazardous elements such as Pb or Be and/or corrodants such as sulfides, chlorides or sulfates. The efficacy of the compounds and minerals for delivering hexavalent chromium inhibitor upon activation depends on the density of Cr(III) in the Cr(III) material. An exemplary list of Cr(III) containing compounds is provided in Table 1.

substrate. The binder must disperse and stabilize the migration and/or diffusion of the Cr(III) micro-particles.

TABLE 1

Minerals Providing a Source of Cr(III)

| Chromium(III) Minerals | Chemical Formula | Density g/cc | MW g/mole | Cr % | Cr(III) density g Cr/cc |
|---|---|---|---|---|---|
| *Oxides and Chromites* | | | | | |
| Eskolaite | Cr2O3 | 5.18 | 151.99 | 68.42 | 3.54 |
| guyanaite | CrO(OH) | 4.53 | 85 | 61.17 | 2.77 |
| bracewellite | Cr+++O(OH) | 4.45 | 85 | 61.17 | 2.72 |
| grimaldite | Cr+++O(OH) | 4.11 | 85 | 61.17 | 2.51 |
| zincochromite | ZnCr2O4 | 5.32 | 233.38 | 44.56 | 2.37 |
| magnesiochromite | MgCr2O4 | 4.2 | 192.29 | 54.08 | 2.27 |
| chromite | Fe++Cr2O4 | 4.79 | 223.84 | 46.46 | 2.23 |
| manganochromite | (Mn, Fe++)(Cr, V)2O4 | 4.86 | 225.53 | 43.8 | 2.13 |
| kalininite | ZnCr2S4 | 3.96 | 297.65 | 34.94 | 1.38 |
| mathiasite | (K, Ca, Sr)(Ti, Cr, Fe, Mg)21O38 | 4.6 | 1,682.56 | 18.54 | 0.85 |
| kosmochlor | NaCr+++Si2O6 | 3.6 | 227.15 | 22.89 | 0.82 |
| vuorelaineite | (Mn++, Fe++)(V+++, Cr+++)2O4 | 4.64 | 221.57 | 11.73 | 0.54 |
| ankangite | Ba(Ti, V+++, Cr+++)8O16 | 4.44 | 803.05 | 1.29 | 0.06 |
| *Silicates* | | | | | |
| olkonskite | (Cr+++, V+++)2Ti3O9 | 4.48 | 391.1 | 19.94 | 0.89 |
| knorringite | Mg3Cr2(SiO4)3 | 3.756 | 453.16 | 22.95 | 0.86 |
| cronusite | Ca0.2(H2O)2CrS2 | 2.51 | 161.98 | 32.1 | 0.81 |
| uvarovite | Ca3Cr2(SiO4)3 | 3.59 | 500.48 | 20.78 | 0.75 |
| chromdravite | NaMg3(Cr, Fe+++)6(BO3)3Si6O18(OH)4 | 3.4 | 1,114.61 | 20.99 | 0.71 |
| redledgeite | BaTi6Cr+++2O16•(H2O) | 3.72 | 802.6 | 12.96 | 0.48 |
| krinovite | NaMg2CrSi3O10 | 3.38 | 367.85 | 14.14 | 0.48 |
| shuiskite | Ca2(Mg, Al)(Cr, Al)2(SiO4)(Si2O7)(OH)2•(H2O) | 3.24 | 506.85 | 13.34 | 0.43 |
| chromeceladonite | KCrMg(Si4O10)(OH)2 | 2.9 | 421.75 | 12.33 | 0.36 |
| loveringite | (Ca, Ce)(Ti, Fe+++, Cr, Mg)21O38 | 4.41 | 1,678.43 | 6.82 | 0.30 |
| volkonskoite | Ca0.3(Cr+++, Mg, Fe+++)2(Si, Al)4O10(OH)2•4(H2O) | 2.25 | 475.69 | 13.12 | 0.30 |
| chromphyllite | (K, Ba)(Cr, Al)2[AlSi3O10](OH, F)2 | 2.88 | 415.64 | 9.38 | 0.27 |
| polyakovite-(Ce) | (Ce, La, Nd, Pr, Ca)4(Mg, Fe++)(Cr, Fe+++)2(Ti, Nb)2Si4O22 | 4.75 | 1,255.42 | 4.97 | 0.24 |
| natalyite | Na(V+++, Cr+++)Si2O6 | 3.55 | 226.36 | 5.74 | 0.20 |
| *Carbonates* | | | | | |
| stichtite | Mg6Cr2(CO3)(OH)16•4(H2O) | 2.2 | 654.01 | 15.9 | 0.35 |
| *Titanates* | | | | | |
| schollhornite | Na0.3CrS2•(H2O) | 2.7 | 141.04 | 36.87 | 1.00 |
| carmichaelite | (Ti, Cr, Fe)[O2—$x$(OH)$x$], $x$~0.5 | 4.13 | 76.54 | 12.91 | 0.53 |

The tri-valent chromium solid is provided as a powder. The particle size of the tri-valent chromium solid will depend upon the application. For example, in one exemplary application, the particle size may be less than about 10 um. In another exemplary application, the particle size may be less than 6 um. In yet another exemplary application, the particle size may be less than 1 um.

The Cr(III) solid is mixed with the stabilized oxidizing agent in step 25 to form a corrosion inhibitor, which is processed to form a powder of a desired size distribution. For example, in one exemplary application, the powder size may be less than about 10 um. In another exemplary application, the powder size may be less than 6 um. In yet another exemplary application, the powder size may be less than 1 um.

A binder is provided in step 26. The binder may be an organic polymer capable of forming a thin film upon drying. The organic polymer may be synthetic or natural. For example, the binder may be an organic polymer may be selected from a group including, but not limited to, an epoxy, a polyurethane, a polyester, an acrylic polymer, an alkyd-based system or an oil. In one embodiment, the epoxy may be a polyimide-based epoxy. The binder may be a component in a system such as a paint, a primer, a sol-gel, a lubricant, a grease, a sealant or other similar material that is applied to a substrate.

The corrosion inhibitor is mixed with the binder in step 29 to form a coating composition. Step 29 is performed by any polymer and solids homogeneous mixing technique as may be appreciated by one of ordinary skill in the art. For example, the mixing may be performed by batch mixing in a ball mill or high speed rotor mill until the composition is homogeneously mixed.

Other additives may optionally be provided in step 27, and added to the binder in step 29. The other additives include, but are not limited to pigments, lubricants, and surfactants. Additionally, an optional solvent can be provided in step 28, and additionally added to the binder in step 29. In an alternative embodiment, the Cr(III) solid and stabilized oxidizing agent may be separately added to the binder and optional additional components.

The coating composition is thereafter applied to the surface 42 of the article 40 and dried at room temperature in step 30 to form an adherent corrosion protective coating (coating) 44 on the surface 42. The application step 30 may be accomplished by any operable approach, with examples being spray, brush, or spin application. The thickness of the coating 44 after drying depends upon the reactivity and viscosity of the coating composition and the application technique. In one embodiment, the coating 44 may have a thickness from about 0.25 um to about 25 um thick. In another embodiment, the coating 44 may have a thickness of from about 8.0 to about 25 um, for example, when the coating 44 is used as a primer.

The article 40 having the coating 44 applied is thereafter typically exposed in a fourth step 26 to a corrosive environment. The corrosive environment typically results from an electrolytic environment, such as from water condensation in the presence of an electrolyte and an oxidant, which increases the electrolytic conductivity at the surface 41 of the article 40. The water may also be present from other natural and/or manmade conditions, including from sea water spray. The electrolyte typically contains a neutral salt such as NaCl, but may be any other source of ionic solutes including the hydrolysis products of $SO_2$ in acid rain, $CO_2$, volatile organic solids such as acetic and formic acids, or traces of $H_2S$. Other sources of ionic contaminants and ionic solutes would include particulate matter such as oxidic or cellulosic dust and soot.

Figure 3:
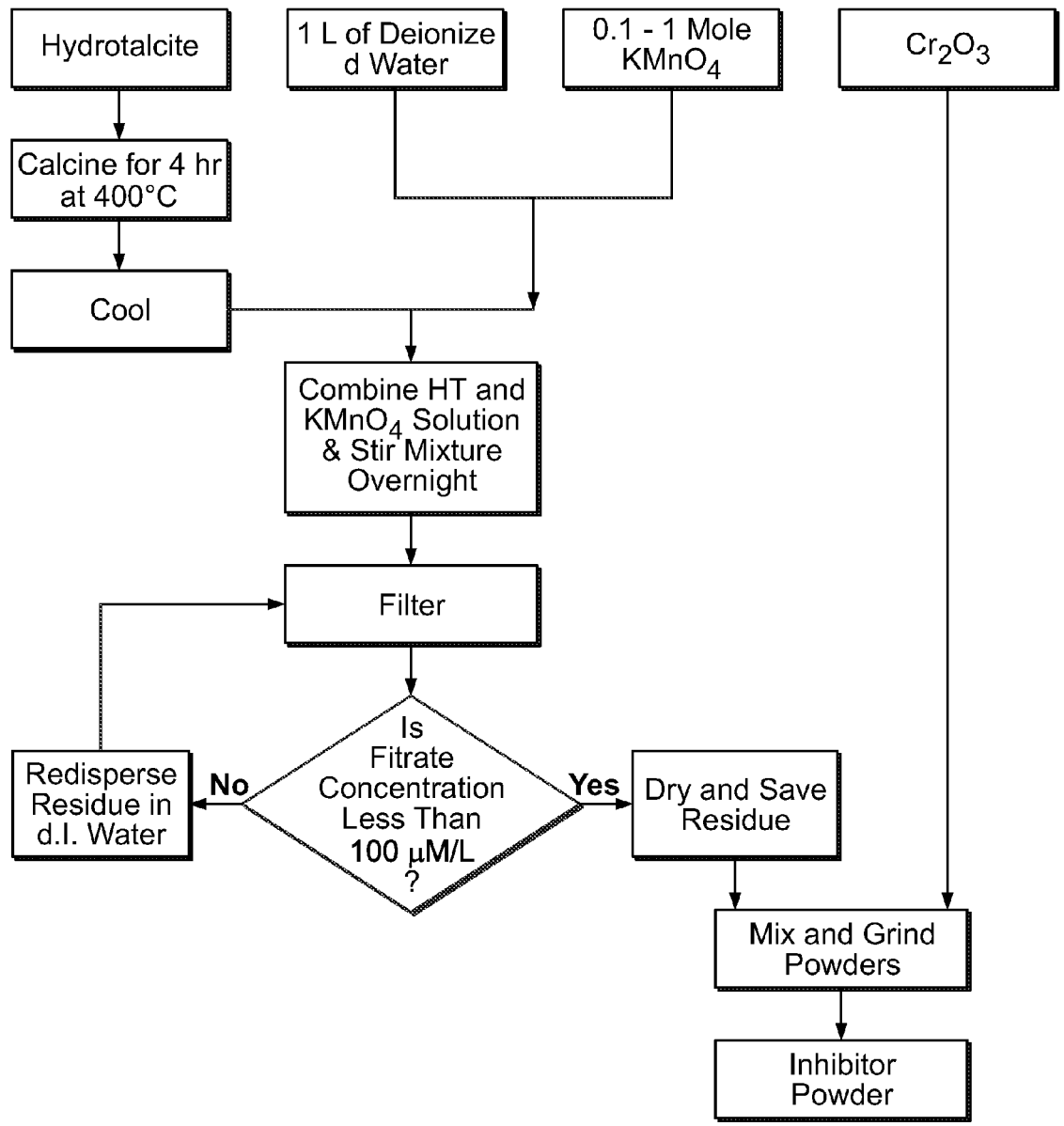
FIG. 3 is an exemplary illustration of the corrosion activated formation of $CrO_4^=$ during exposure to a corrosive environment.

An example of the method described above is shown in FIG. 3. In the example shown in FIG. 3, a permanganate substituted hydrotalcite as produced by first calcining as-received Al, Mg hydrotalcite supplied by Aldrich Corp. at 450° C. for 4 hours in air. After cooling in air, the resulting solid was added to a 0.5 M $KMnO_4$ solution in water. A pink to purple solid resulted which was collected and washed and filtered multiple times until the release of KMnO4 was negligible as observed spectroscopically through the intense absorption by the $MnO_4$ anion at 525.6 nm. This material was ground in a ratio of 1:9 with reagent grade $Cr_2O_3$ to form the inhibitor powder.

Figure 4A:
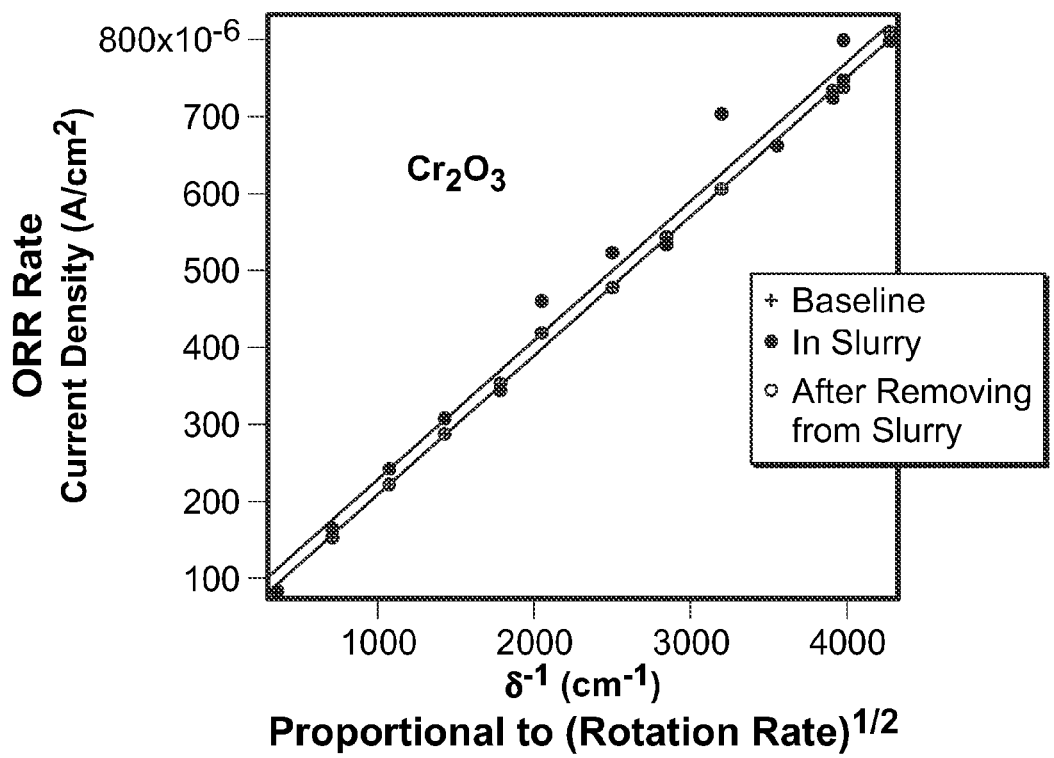
FIGS. 4A and 4B present test data evaluating inhibitor powder ability to inhibit oxygen reduction.
Figure 4B:
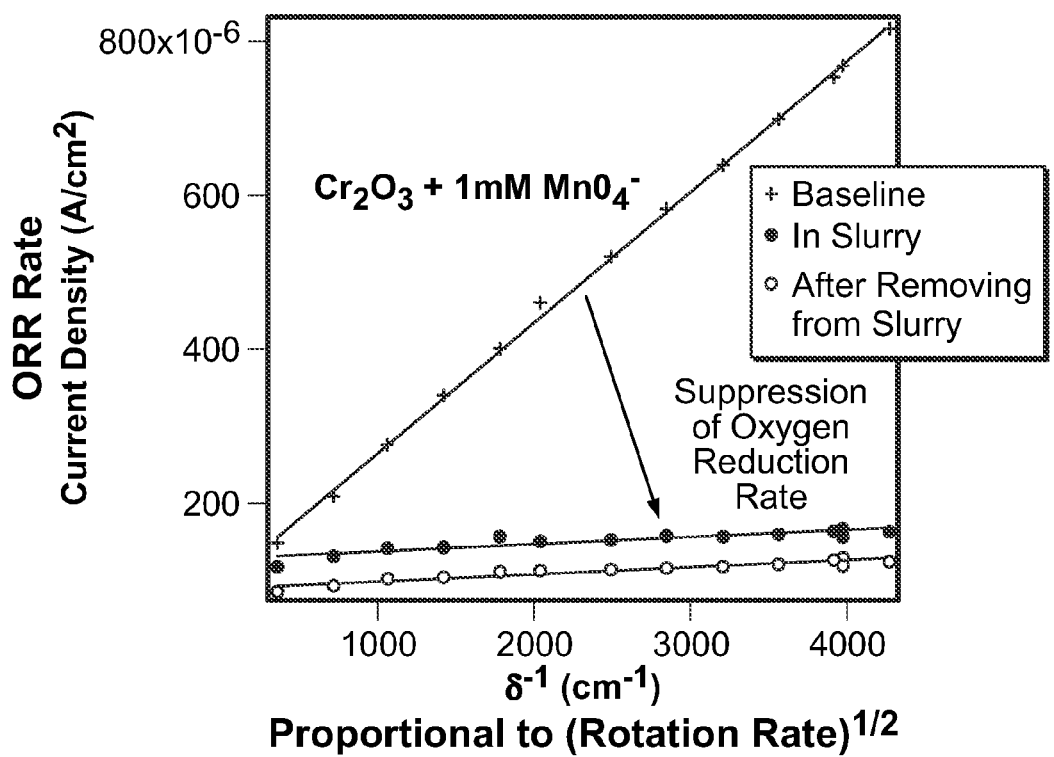

The resulting inhibitor powder and pure $Cr_2O_3$ were evaluated for their ability to inhibit oxygen reduction by dispersing 1 g/100 mL of 5% NaCl. The results of this evaluation are shown in FIGS. 4A and 4B. As shown in FIGS. 4A and 4B, the current for a Cu rotating disk electrode biased at −0.7 V vs Ag/AgCl reference in the solution depended on the rotation rate. As shown in FIG. 4A, $Cr_2O_3$ releases no inhibitor since there is little change in the oxygen reduction current as compared to the rotating Cu disk current in 5% NaCl containing no dispersed solid. FIG. 4B shows the Cu rotating disk current in the 5% NaCl blank and the 5% NaCl with the dispersed mixture of $Cr_2O_3$ and $MnO_4^-$ substituted hydrotalcite. In this latter case, the oxygen reduction current has been substantially reduced in the presence of the activated inhibitor.

As evidence for the activation by NaCl, the hydrotalcite was placed in deionized water or in 5% NaCl. It was visually and spectroscopically observed that in the presence of the chloride electrolyte a substantially greater quantity of permanganate was released, demonstrating the ion exchange activation of the release of the oxidizing compound.

Figure 5A:
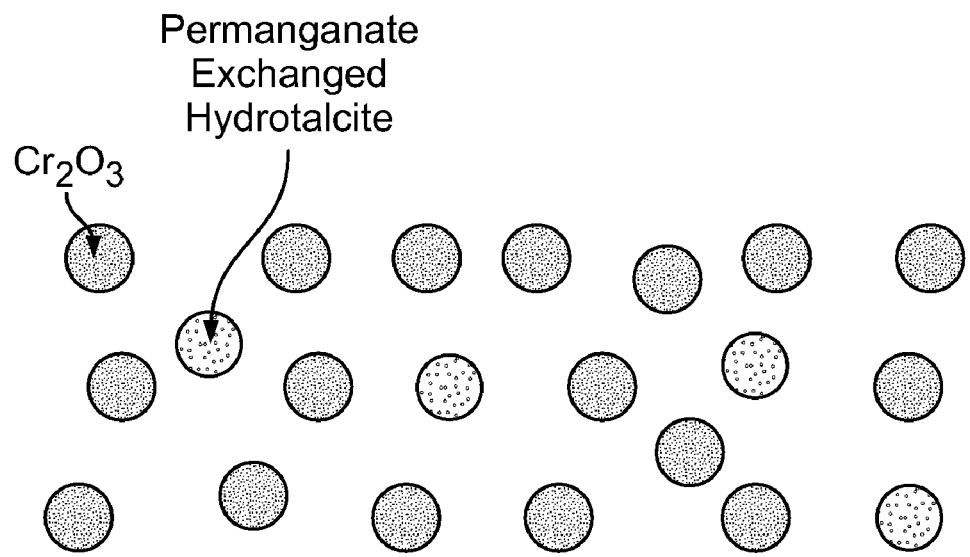
FIGS. 5A and 5B illustrate an inhibitor coating and the resultant reaction in the coating from exposure to a corrosive environment, respectively.
Figure 5B:
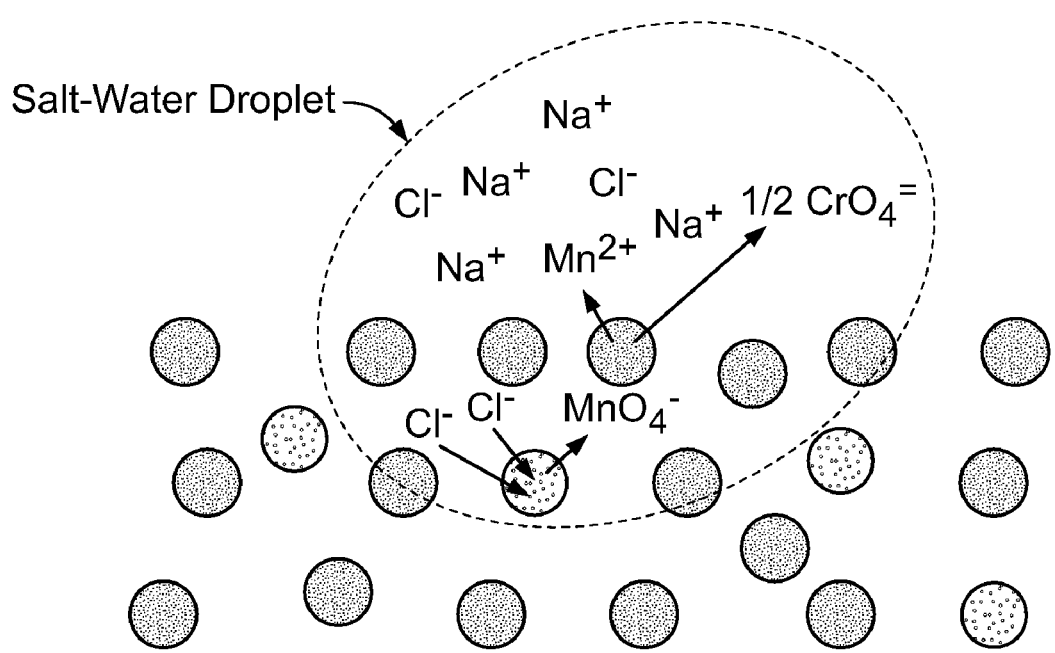

As schematically illustrated in FIGS. 5A and 5B, the benign coating including permanganate exchanged hydrotalcite and $Cr_2O_3$ shown in FIG. 5A, in the presence of a corrosive environment having the negative ion of an electrolyte, for example Cl− as shown in FIG. 5B, releases $MnO_4^-$ from the layered hydrotalcite compound through an ion exchange mechanism. The released $MnO_4^-$ reacts with the Cr(III) component, for example $Cr_2O_3$, to form soluble $CrO_4^=$ compounds. The activity of the $CrO_4^=$ in the aqueous phase reacts with metal at imperfections in the coating so as to slow the oxygen reduction half of corrosion reaction, as would be appreciated by one of ordinary skill in the art. The coating layer in the area of the corrosive environment now contains $CrO_4^=$ that will inhibit corrosion by mechanisms as appreciated by one of ordinary skill in the art.

While a number of exemplary embodiments and aspects have been illustrated and discussed above, those of skill in the art will recognize certain modifications, permutations, additions, and sub-combinations thereof. It is therefore intended that the following appended claims and claims hereafter introduced are interpreted to include all such modifications, permutations, additions, and sub-combinations as are within their true spirit and scope.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A corrosion inhibiting composition, consisting essentially of:
   a binder;
   a tri-valent chromium solid; and
   a stabilized oxidizing agent selected from the group consisting of an oxidizing agent ion exchanged into a hydrotalcite, an oxidizing agent ion exchanged into a zeolite, an oxidizing agent intercalated with graphene, and an oxidizing agent absorbed on nano-particles.

2. The composition of claim 1, wherein the tri-valent chromium solid is selected from the group consisting of Cr(III) oxides, chromites, silicates, carbonates and titanates.

3. The composition of claim 1,
   wherein the stabilized oxidizing agent is selected from the group consisting of an oxidizing agent ion exchanged into a hydrotalcite, an oxidizing agent ion exchanged into a zeolite, an oxidizing agent intercalated with graphene, and an oxidizing agent absorbed on nano-particles, and
   wherein the oxidizing agent is selected from the group consisting of $MnO_4^-$, $H_2O_2$, peroxydisulfate, $Ce^{4+}$, $VO_3^-$, peroxide, and peroxydiacetate.

4. The composition of claim 1,
   wherein the stabilized oxidizing agent is selected from the group consisting of an oxidizing agent ion exchanged into a hydrotalcite, an oxidizing agent ion exchanged into a zeolite, an oxidizing agent intercalated with graphene, and an oxidizing agent absorbed on nano-particles, and
   wherein the oxidizing agent is $MnO_4^-$.

5. The composition of claim 1, wherein the binder is an organic polymer selected from the group consisting of an epoxy, a polyurethane, a polyester, an acrylic polymer, an alkyd-based system, and an oil.

6. The composition of claim 1, wherein the binder is an organic polymer constituent of a system, the system selected from the group consisting of a paint, a primer, a sol-gel, a lubricant, a grease, and a sealant.

7. The composition of claim 1, wherein the binder is an epoxy.

8. A method of protecting a surface of a metallic article, the method comprising the steps of:
   providing a metal article having a surface;
   a corrosion inhibiting the surface with a corrosion inhibiting composition to form a coated surface, the coating composition consisting essentially of a binder, a tri-valent chromium solid, and a stabilized oxidizing agent selected from the group consisting of an oxidizing agent ion exchanged into a hydrotalcite, an oxidizing agent ion exchanged into a zeolite, an oxidizing agent intercalated with graphene, and an oxidizing agent absorbed on nano-particles.

9. The method of claim 8, wherein the tri-valent chromium solid is selected from the group consisting of Cr(III) oxides, chromites, silicates, carbonates and titanates.

10. The method of claim 8,
wherein the stabilized oxidizing agent is selected from the group consisting of an oxidizing agent ion exchanged into a hydrotalcite, an oxidizing agent ion exchanged into a zeolite, an oxidizing agent intercalated with graphene, and an oxidizing agent absorbed on nano-particles, and
wherein the oxidizing agent comprises an oxidizing agent selected from the group consisting of $MnO_4^-$, $H_2O_2$, peroxydisulfate, $Ce^{4+}$, $VO_3^-$, peroxy-disulfate, peroxide, and peroxydiacetate.

11. The method of claim 8,
wherein the stabilized oxidizing agent is selected from the group consisting of an oxidizing agent ion exchanged into a hydrotalcite, an oxidizing agent ion exchanged into a zeolite, an oxidizing agent intercalated with graphene, and an oxidizing agent absorbed on nano-particles, and
wherein the oxidizing agent comprises $MnO_4^-$.

12. The method of claim 8, wherein the binder is an organic polymer selected from the group consisting of an epoxy, a polyurethane, a polyester, an acrylic polymer, an alkyd-based system, and an oil.

13. The method of claim 8, wherein the binder is an organic polymer constituent of a system, the system selected from the group consisting of a paint, a primer, a sol-gel, a lubricant, a grease, and a sealant.

14. The method of claim 8, wherein the binder is an epoxy.

15. The method of claim 8, wherein the article is formed from a metal selected from the group consisting of aluminum, carbon steel, magnesium alloys, copper, brass, and bronze.

16. The method of claim 8, wherein the article is formed of aluminum.

17. The method of claim 8, further comprising:
exposing the coated surface to a corrosive environment, and forming $CrO_4^=$ from the tri-valent chromium solid.

18. A coated article comprising:
a surface;
a coating adhered to the surface,
wherein the coating consists essentially of a binder, a tri-valent chromium solid, and a stabilized oxidizing agent selected from the group consisting of an oxidizing agent ion exchanged into a hydrotalcite, an oxidizing agent ion exchanged into a zeolite, an oxidizing agent intercalated with graphene, and an oxidizing agent absorbed on nano-particles.

19. The coated article of claim 18, wherein the tri-valent chromium solid forms $CrO_4^=$ in the presence of a corrosive environment.

20. The coated article of claim 18, wherein the tri-valent chromium solid is selected from the group consisting of Cr(III) oxides, chromites, silicates, carbonates and titanates.

21. A corrosion inhibiting mixture, consisting essentially of:
a Cr(III) solid; and
a stabilized oxidizing agent selected from the group consisting of an oxidizing agent ion exchanged into a hydrotalcite, an oxidizing agent ion exchanged into a zeolite, an oxidizing agent intercalated with graphene, and an oxidizing agent absorbed on nano-particles.

22. The mixture of claim 21, wherein the Cr(III) solid is selected from the group consisting of Cr(III) oxides, chromites, silicates, carbonates and titanates.

23. The mixture of claim 21,
wherein the stabilized oxidizing agent is selected from the group consisting of an oxidizing agent ion exchanged into a hydrotalcite, an oxidizing agent ion exchanged into a zeolite, an oxidizing agent intercalated with graphene, and an oxidizing agent absorbed on nano-particles, and
wherein the oxidizing agent comprises an oxidizing agent selected from the group consisting of $MnO_4^-$, $H_2O_2$, peroxydisulfate, $Ce^{4+}$, $VO_3^-$, peroxy-disulfate, peroxide, and peroxydiacetate.

24. The mixture of claim 21, wherein the Cr(III) solid is $Cr_2O_3$,
wherein the stabilized oxidizing agent is selected from the group consisting of an oxidizing agent ion exchanged into a hydrotalcite, an oxidizing agent ion exchanged into a zeolite, an oxidizing agent intercalated with graphene, and an oxidizing agent absorbed on nano-particles, and
wherein the stabilized oxidizing agent comprises $MnO_4^-$.

* * * * *